US011852150B2

(12) United States Patent
Helgerson et al.

(10) Patent No.: US 11,852,150 B2
(45) Date of Patent: Dec. 26, 2023

(54) GAS BEARING MANAGEMENT FOR A COMPRESSOR

(71) Applicant: TRANE INTERNATIONAL INC., Davidson, NC (US)

(72) Inventors: Jacob T. Helgerson, La Crosse, WI (US); Jay H. Johnson, Houston, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 72 days.

(21) Appl. No.: 17/646,669

(22) Filed: Dec. 30, 2021

(65) Prior Publication Data

US 2023/0213038 A1    Jul. 6, 2023

(51) Int. Cl.
*F25B 49/02* (2006.01)
*F04D 25/06* (2006.01)
(Continued)

(52) U.S. Cl.
CPC ....... *F04D 25/0606* (2013.01); *F04D 17/122* (2013.01); *F04D 29/057* (2013.01); *F04D 29/0513* (2013.01); *F04D 29/063* (2013.01); *F04D 29/286* (2013.01); *F04D 29/4206* (2013.01); *F04D 29/5806* (2013.01);
(Continued)

(58) Field of Classification Search
CPC .. F04D 29/057; F04D 29/0513; F04D 29/047; F04D 29/0413; F04D 27/004; F04D 27/007; F04D 27/009; F04D 27/0261; F16C 32/06–0625; F25B 49/02; F25B 49/022; F25B 2600/025
See application file for complete search history.

(56) References Cited

U.S. PATENT DOCUMENTS 5,066,197 A * 11/1991 Champagne ........ F04D 27/0292
62/505
10,317,121 B2     6/2019 Johnson
(Continued)

FOREIGN PATENT DOCUMENTS

WO    2017/199087 A1    11/2017

OTHER PUBLICATIONS

Extended European Search Report, European Patent Application No. 22213795.2, dated May 8, 2023 (5 pages).

*Primary Examiner* — Woody A Lee, Jr.
*Assistant Examiner* — Behnoush Haghighian
(74) *Attorney, Agent, or Firm* — Hamre, Schumann, Mueller & Larson, P.C.

(57) ABSTRACT

A heating, ventilation, air conditioning, and refrigeration (HVACR) system includes a compressor with a gas bearing supplied with compressed gas and a controller. The controller is configured to determine an inlet pressure and outlet pressure of the gas bearing, determine a maximum speed limit based on the inlet pressure and the outlet pressure, and prevent the compressor from operating at a speed that is greater than the maximum speed limit. A method of controlling a compressor includes calculating a maximum speed limit based on an inlet pressure and an outlet pressure of the gas bearing. The method also includes in response to determining that a speed setting is greater than the maximum speed limit, adjusting operation of the compressor such that a speed of the compressor is at or below the maximum speed limit.

16 Claims, 3 Drawing Sheets

(51) Int. Cl.
| | |
|---|---|
| *F04D 17/12* | (2006.01) |
| *F04D 29/051* | (2006.01) |
| *F04D 29/057* | (2006.01) |
| *F04D 29/063* | (2006.01) |
| *F04D 29/28* | (2006.01) |
| *F04D 29/42* | (2006.01) |
| *F04D 29/58* | (2006.01) |
| *F16C 32/06* | (2006.01) |
| *F25B 31/00* | (2006.01) |
| *F04D 27/00* | (2006.01) |

(52) U.S. Cl.
CPC ........ *F16C 32/064* (2013.01); *F16C 32/0618* (2013.01); *F16C 32/0662* (2013.01); *F16C 32/0696* (2013.01); *F25B 31/002* (2013.01); *F25B 49/022* (2013.01); *F04D 27/004* (2013.01); *F16C 2360/44* (2013.01); *F25B 2400/07* (2013.01); *F25B 2600/025* (2013.01)

(56) References Cited

U.S. PATENT DOCUMENTS

| | | | |
|---|---|---|---|
| 2009/0220338 A1 | 9/2009 | Ietka | |
| 2017/0146271 A1* | 5/2017 | Hasegawa | F04D 29/582 |
| 2017/0248346 A1* | 8/2017 | Creamer | F04C 18/0207 |
| 2017/0339716 A1 | 11/2017 | Gu et al. | |
| 2017/0370364 A1* | 12/2017 | Gu | F16C 32/0696 |
| 2018/0023584 A1* | 1/2018 | Morgan | F16C 17/026 |
| | | | 62/498 |
| 2018/0313402 A1* | 11/2018 | Jiang | F16C 17/026 |
| 2021/0095682 A1* | 4/2021 | Jeung | F25B 31/006 |
| 2021/0115929 A1* | 4/2021 | Nakazawa | F04D 27/0261 |
| 2023/0213037 A1* | 7/2023 | Helgerson | F04D 29/063 |
| | | | 62/279 |

\* cited by examiner

GAS BEARING MANAGEMENT FOR A COMPRESSOR

FIELD

This disclosure generally relates to heating, ventilation, air conditioning, and refrigeration (HVACR) systems. More specifically, this disclosure relates to managing the operation of gas bearings in compressors of HVACR systems.

BACKGROUND

A heating, ventilation, air conditioning, and refrigeration (HVACR) system generally includes a compressor. Compressors include one or more bearings for supporting its moving/rotating components within the compressor, such as but not limited to, a rotating driveshaft. A bearing can be a gas bearing that utilizes compressed gas to provide support to its moving/rotating component.

SUMMARY

A heating, ventilation, air conditioning, and refrigeration (HVACR) system includes a heat transfer circuit and a controller. The heat transfer circuit includes a compressor, a condenser, an expander, and an evaporator that are fluidly connected. The compressor includes a gas bearing, and one or more of the compressor and an external gas source is configured to supply compressed gas to the gas bearing. The controller is electrically connected to the compressor. The controller is configured to determine an inlet pressure of the compressed gas supplied to the gas bearing and an outlet pressure of the compressed gas exiting the gas bearing, determine a maximum speed limit for the compressor based on the inlet pressure and the outlet pressure, and prevent the compressor from operating at a speed that is greater than the maximum speed limit.

A method of controlling a compressor includes supplying compressed gas to a gas bearing of the compressor. The method also includes determining, using a controller of the compressor: a speed setting for the compressor based on a cooling requirement, an inlet pressure of the compressed gas supplied to the gas bearing, an outlet pressure of compressed gas exiting the gas bearing. The method also includes calculating, using the controller of the compressor, a maximum speed limit for the compressor based on the inlet pressure of the compressed gas and the outlet pressure of the gas bearing. The method further includes that in response to determining that the speed setting is greater than the maximum speed limit as calculated, the controller adjusts operation of the compressor such that a speed of the compressor is at or below the maximum speed limit.

DRAWINGS

Like numbers represent like features.

DETAILED DESCRIPTION

A heating, ventilation, air conditioning, and refrigeration ("HVACR") system is generally configured to heat and/or cool an enclosed space (e.g., an interior space of a commercial or residential building, an interior space of a refrigerated transport unit, or the like). The HVACR system includes a heat transfer circuit that includes a compressor and a working fluid (e.g., a refrigerant, a refrigerant mixture, or the like) that circulates through the heat transfer circuit. The working fluid is utilized to heat or cool a process fluid (e.g., air, water and/or glycol, or the like).

The compressor includes components (e.g., driveshaft, scroll, rotor, screws, impeller, or the like) that move relative to the housing of the compressor to compress the working fluid. One or more gas bearing(s) are provided to support said components within the compressor. A gas bearing can be aerodynamic gas bearing, an aerostatic bearing, or a hybrid gas bearing. An aerodynamic gas bearing is a gas bearing that relies upon being provided with a supply of compressed gas to operate and provide support. A hybrid gas bearing is a gas bearing that can provide support during normal operation and relies upon being provided with a supply of compressed gas during the startup and shutdown of the compressor to provide support. An aerodynamic gas bearing is a gas bearing that does not utilize a supply of compressed gas to provide its support. The aerostatic and hybrid gas bearings are supplied with compressed gas which is utilized by the gas bearing(s) to provide adequate support to the moving components of the compressor. The compressed gas supplied to the aerostatic and hybrid gas bearing(s) can be a portion of the working fluid compressed by the compressor. Some operating conditions of the compressor, such as but not limited to, when operated at higher speeds and/or when the gas bearing vents to a higher pressure, can cause sub synchronous instabilities in the gas bearing(s) that utilize the working fluid causing the support provided by the gas bearing(s) to become unstable. This instability in the gas bearing(s) can lead to failure of the gas bearing(s) and damage to the compressor.

Embodiment described herein are directed to HVACR systems, compressors of HVACR systems, and methods of controlling a compressor of an HVACR system that operate in a manner that ensures stable operation of the gas bearing(s) in the compressor.

Figure 1:
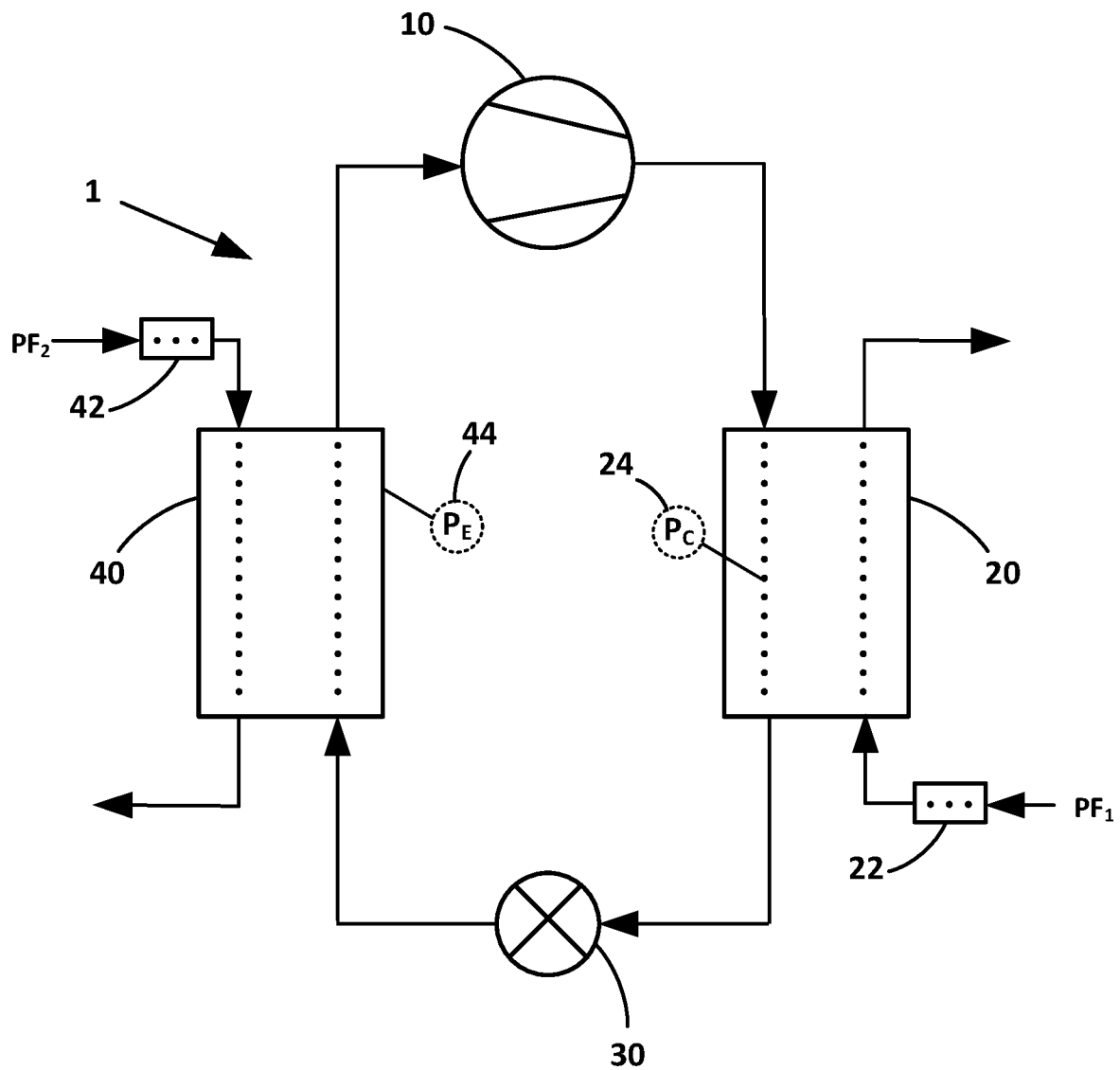
FIG. 1 is a schematic diagram of an embodiment of a heat transfer circuit of a HVACR system.

FIG. 1 is a schematic diagram of a heat transfer circuit 1 of a HVACR system, according to an embodiment. The heat transfer circuit 1 includes a compressor 10, a condenser 20, an expansion device 30, and an evaporator 40. In an embodiment, the heat transfer circuit 1 can be modified to include additional components. For example, the heat transfer circuit 1 in an embodiment can include an economizer heat exchanger, one or more flow control devices, a receiver tank, a dryer, a suction-liquid heat exchanger, or the like.

The components of the heat transfer circuit 1 are fluidly connected. The heat transfer circuit 1 can be configured as a cooling system (e.g., a fluid chiller of an HVACR, an air conditioning system, or the like) that can be operated in a cooling mode, and/or the heat transfer circuit 1 can be configured to operate as a heat pump system that can run in a cooling mode and a heating mode.

The heat transfer circuit 1 applies known principles of gas compression and heat transfer. The heat transfer circuit can be configured to heat or cool a process fluid (e.g., water, air, or the like). In an embodiment, the heat transfer circuit 1 may represent a chiller that cools a process fluid such as water or the like. In an embodiment, the heat transfer circuit 1 may represent an air conditioner and/or a heat pump that cools and/or heats a process fluid such as air, water, or the like.

During the operation of the heat transfer circuit 1, a working fluid (e.g., refrigerant, refrigerant mixture, or the like) flows into the compressor 10 from the evaporator 40 in a gaseous state at a relatively lower pressure. The compressor 10 compresses the gas into a high pressure state, which also heats the gas. After being compressed, the relatively higher pressure and higher temperature gas flows from the compressor 10 to the condenser 20. In addition to the working fluid flowing through the condenser 20, a first process fluid $PF_1$ (e.g., external air, external water, chiller water, or the like) also separately flows through the condenser 20. The HVACR system can include a condenser fan or pump 22 that blows/pumps the first process fluid $PF_1$ through the condenser 20. The HVCAR system can also include a pressure sensor 24 that senses a pressure Pc of the working fluid in the condenser 20. The first process fluid $PF_1$ flows through the condenser 20, which cools the working fluid as it flows through the condenser. The working fluid condenses to liquid and then flows into the expansion device 30.

The expansion device 30 allows the working fluid to expand, which converts the working fluid to a mixed vapor and liquid state. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any type of expander used in the field for expanding a working fluid to cause the working fluid to decrease in pressure and temperature.

The relatively lower temperature, vapor/liquid working fluid then flows into the evaporator 40. A second process fluid $PF_2$ (e.g., air, water, or the like) also flows through the evaporator 40. The HVACR system can include an evaporator fan or pump 42 that blows/pumps the second process fluid $PF_2$ through the evaporator 40. The HVCAR system can also include a pressure sensor 44 that senses a pressure Pc of the working fluid in the evaporator 44. The working fluid absorbs heat from the second process fluid $PF_2$ as it flows through the evaporator 40, which cools the second process fluid $PF_2$ as it flows through the evaporator 40. As the working fluid absorbs heat, the working fluid evaporates to vapor. The working fluid then returns to the compressor 10 from the evaporator 40. The above-described process continues while the heat transfer circuit 1 is operated, for example, in a cooling mode.

Figure 2:
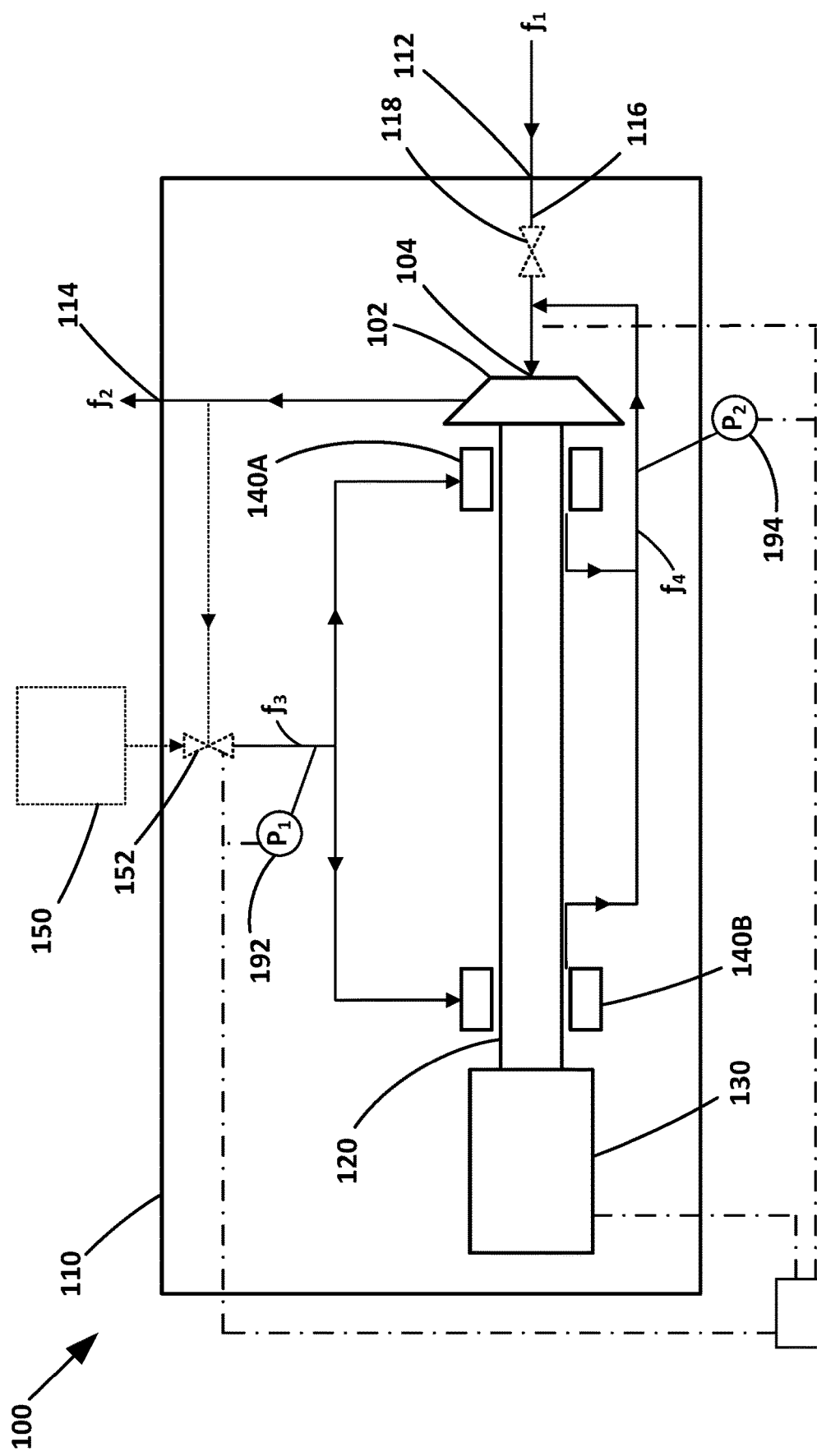
FIG. 2 is schematic diagram of an embodiment of a compressor.

FIG. 2 is a schematic diagram of an embodiment of a compressor 100. The compressor 100 is included in a heat transfer circuit of an HVACR system. For example, the compressor 100 may be the compressor 10 in FIG. 1. The compressor 100 includes a compression mechanism 102, an outer housing 110, a driveshaft 120, a motor 130, and gas bearings 140A, 140B. The gas bearings 140A, 140B are configured to support the driveshaft 120 within the housing 100 while the driveshaft 120 rotates. In an embodiment, each of the gas bearing(s) 140A, 140B is one of an aerostatic bearings or a hybrid gas bearing. In an embodiment, the gas bearing(s) are aerostatic bearings configured to be supplied with compressed gas at least during normal operation of the compressor 100. In an embodiment, the compressor 100 may include one or more of the gas bearing(s) 140A, 140B for supporting the shaft 120. The compressor 100 is shown in FIG. 1 as a single stage compressor. However, it should be appreciated that compressor 100 in an embodiment may be a multi-stage compressor having more than one compressor stage.

The compression mechanism is configured to compress the gaseous working fluid $f_1$. The compression mechanism 102 can generally be type selected from those used in compressors of HVACR systems. The compression mechanism 102 is affixed to the driveshaft 120 (e.g., to an end of the driveshaft 120) and rotates with the driveshaft 120. The motor 130 is configured to rotate the driveshaft 120, which rotates the affixed compression mechanism 102. The compression mechanism 102 is affixed to the driveshaft 120 (e.g., to an end of the driveshaft 120) and rotates with the driveshaft 120. The compression mechanism 102 may be for example, but is not limited to, an impeller, a pair of intermeshed scroll member (e.g., a moveable scroll member that is intermeshed with a second scroll member), intermeshed screw (e.g., a rotatable screw that is intermeshed with one or more other screws), or the like. The motor 130 rotates the driveshaft 120 which drives the compression mechanism 102 compressing the working fluid. For example, the impeller, the moveable scroll member, or the rotatable screw is affixed to the driveshaft 120 and rotates with the driveshaft 120 to compress the working fluid.

In an embodiment, the compressor 100 is a variable speed compressor. For example, the motor 130 is a variable speed motor that is configured to operate and rotate at multiple different speeds. The controller 190 is capable of adjusting/selecting a speed of the motor 130 based on the cooling requirement of the heat transfer circuit/HVACR system. In an embodiment, the motor 130 may be an electric motor. The electric motor operates according to known principles. For example, the motor 130 can be an electric motor that includes a rotor (not shown) affixed to the driveshaft 120 and a stator (not shown) that rotates the rotor and the driveshaft. In another embodiment, the driveshaft 112 may be connected to and rotated by an external electric motor, an internal combustion engine (e.g., a diesel engine or a gasoline engine), or the like.

The gaseous working fluid $f_1$ enters the compressor 100 through the suction inlet 112, is compressed by the compression mechanism 102, and the compressed gaseous working fluid $f_2$ is then discharged from the compressor 100 through the discharge outlet 114. As shown in FIG. 2, a portion of the compressed gas $f_3$ is supplied to the gas bearings 140A, 140B of the compressor 110. The compressed gas is compressed gas utilized by each of the gas bearings 140A, 140B to provide support to the driveshaft 120. For example, the gas bearings 140A, 140B are configured to form a layer of the compressed gas along the exterior of the driveshaft 120 that levitates the driveshaft 120 within the gas bearings 140A, 140B. A pressure sensor 192 senses the pressure $P_2$ of the compressed gas $f_3$ being supplied to the gas bearings 140A, 140B. This pressure of the compressed gas $f_3$ entering the gas bearing 140A, 140B may be also be referred to as the inlet pressure of the gas bearings 140A, 140B. The controller 190 can determine the inlet pressure $P_1$ of the gas bearings 140A, 140B using the pressure sensor 192.

In another embodiment, the compressed gas $f_3$ may be supplied from an external gas source 150. The external gas source 150 may be, for example, an auxiliary compressor a pressure storage tank with a heater (e.g., to generate compressed refrigerant by evaporating liquid refrigerant in the enclosed pressure storage tank). In an embodiment, a supply valve 152 (e.g., a throttling valve, a pressure regular valve, or the like) may be used to control the flow rate and/or the pressure $P_1$ of the compressed gas $f_3$ supplied to the gas bearings 140A, 140B either from the compression mechanism 102 or from the external pressure source 150. The controller 190 may be configured to adjust the gas supply valve 152 (e.g., open it further, close it further, etc.) to increase and/or decrease the flow of compressed gas $f_3$ to the gas bearings 140A, 140B.

The compressed gas flows through the gas bearings 140A, 140B and is discharged from the bearings 140A, 140B at an outlet pressure $P_2$. As shown in FIG. 2, the compressor 100 can be configured to vent the gas bearings 140A, 140B to the suction inlet 112. For example, the gas bearings 140A, 140B are configured to discharge their compressed gas $f_4$ to an inlet passage 116 for the compressor mechanism 102 (e.g., an inlet passage/volume within the housing 100 through which the gas to be compressed $f_1$ passes to flow into the inlet 104 of compression mechanism 102). The gas $f_3$ discharged from the gas bearings 140A, 140B mixes with inlet gas $f_1$ and is then compressed again by the compression mechanism 102. In the illustrated embodiment, the outlet pressure $P_2$ of the gas bearings 140A, 140B is at or about the suction pressure of the compressor 100 (e.g., the pressure of the fluid entering the suction inlet 112 of the compressor 110). A pressure sensor 194 senses the outlet pressure $P_2$ of the gas bearings 140A, 140B. The controller 190 can determine the outlet pressure $P_2$ of the gas bearings 140A, 140B using the pressure sensor 194.

In an embodiment, the compressor 100 may include a pressure reducer 118 that reduces the outlet pressure $P_2$ of the gas bearing 140A. The pressure reducer 118 can be a venturi, an eductor, an ejector, a vacuum pump, or similar device, or can utilize the components of the compressor 100 to reduce the outlet pressure $P_2$ (e.g., by adjusting the inlet guide vanes of a centrifugal compressor or suction inlet valve of a screw compressor). In an embodiment, the pressure reducer 118 is one of inlet guide vanes and a suction inlet valve configured to be adjustable to controlling the flow rate of the gaseous working fluid into the compression mechanism 102. The position of the inlet guide vanes or suction inlet valve (e.g., amount/degree closed) is adjustable to change the flow rate through the inlet guides vanes or suction inlet valve and into the compression mechanism 102. As shown in FIG. 2, as the gas bearings 140A, 140B are configured to vent to location downstream of the inlet guide vanes or suction inlet valve (e.g., the pressure reducer 118 in FIG. 2), the position of the inlet guide vanes or suction can be adjusted to adjust the outlet pressure $P_2$ of the gas bearings 140A, 140B. For example, the inlet guide vanes or suction inlet valve can be partially closed/closed further to decrease the outlet pressure $P_2$ of the gas bearings 140A, 140B. For example, the inlet guide vanes or suction inlet valve can be opened further to increase the discharge pressure $P_2$ of the gas bearings 140A, 140B. The controller 190 may control the actuator (not shown) of the inlet guide vanes/suction inlet valve to adjust the position of the inlet guide vanes/suction inlet valve (e.g., to open/close the inlet guide vanes/suction inlet valve).

Dashed dotted lines are provided in the Figures to illustrate electronic communications between different features. For example, in FIG. 2, a dashed dotted line extends from a controller 190 to a pressure sensor 192 as the controller 190 receives measurements (e.g., pressure measurements) from the pressure sensor 192. For example, a dashed-dotted line extends from the controller 190 to the motor 130 as the controller 190 controls the speed of the motor 130 (e.g., controls the electrical power supplied to the motor 130, adjusts the electrical power drawn by the motor 130). In an embodiment, the controller 190 includes memory for storing information and a processor. The controller 190 in FIG. 2 and described below is described/shown as a single component. However, it should be appreciated that a "controller" as shown in the Figures and described herein may include multiple discrete or interconnected components that include a memory and a processor in an embodiment. In an embodiment, the controller 190 may be a controller of the HVACR system of the compressor 100. In an embodiment, the controller 190 may be the controller of the compressor 100.

Figure 3:
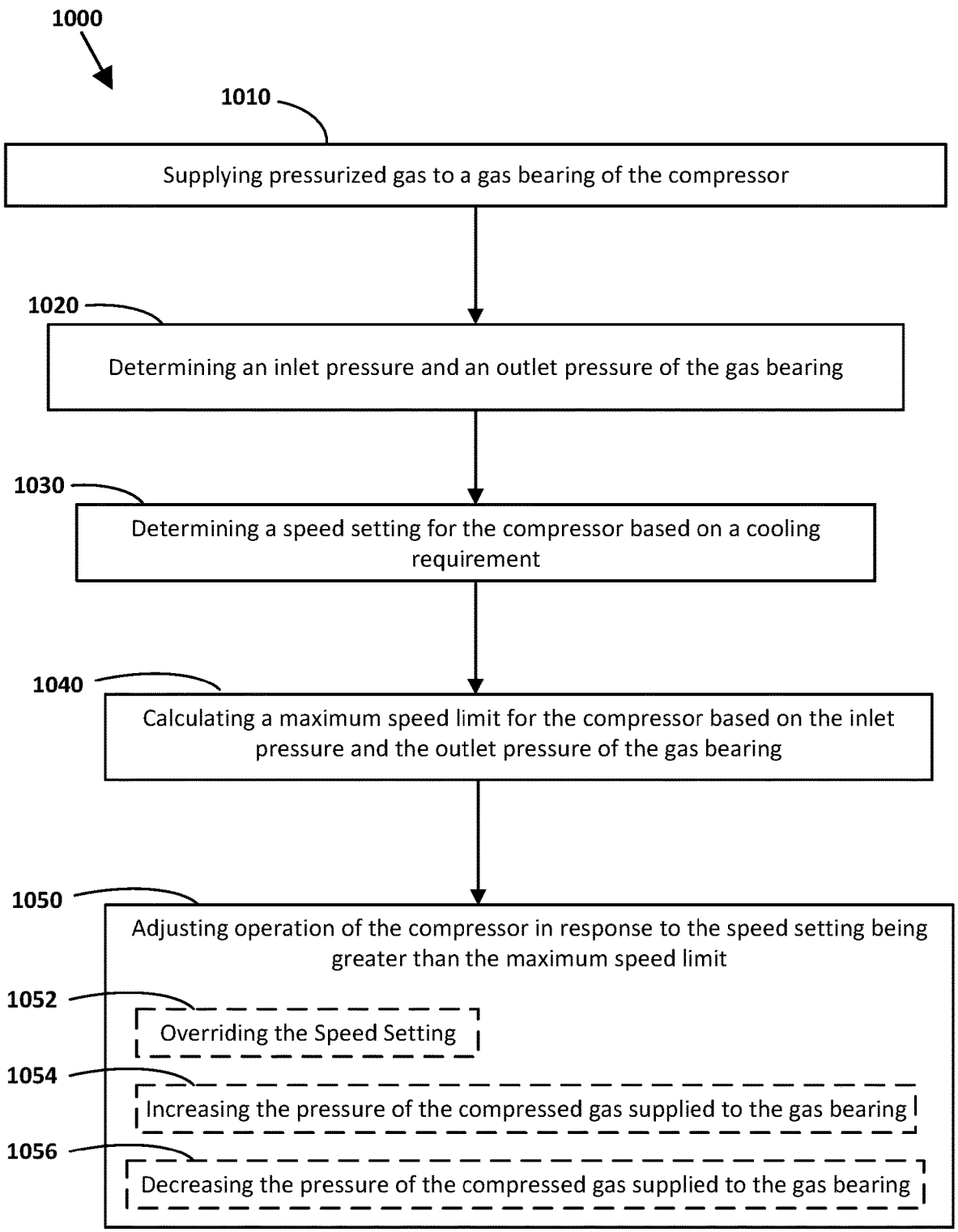
FIG. 3 is a block flow diagram of a method of controller a compressor.

FIG. 3 is a block flow diagram of an embodiment of a method 1000 of controlling a compressor. In an embodiment, the method 1000 may be used for controlling the compressor 10 in FIG. 1. In an embodiment, the method 1000 may be used for controlling the compressor 100 in FIG. 2. For example, the method 1000 may be carried out by the controller 190 for the compressor 100 in FIG. 2. The method starts at 1100.

At 1010, compressed gas (e.g., compressed gas $f_3$) is supplied to a gas bearing of the compressor (e.g., gas bearing 140A, gas bearing 140B). In an embodiment, supplying the gas to the gas bearing at 1010 can include a compression mechanism of the compressor (e.g., compression mechanism 102) compressing a gaseous working fluid (e.g., gaseous working fluid $f_3$) and supplying a portion of the compressed working fluid to the gas bearings. The portion of compressed working fluid being the compressed gas supplied to the gas bearings. The method 1000 then proceeds from 1010 to 1020.

At 1020, a controller (e.g., controller 190) determines an inlet pressure of the gas bearing (e.g., inlet pressure $P_1$) and an outlet pressure of the gas bearing (e.g., outlet pressure $P_2$). Determining the inlet pressure of the gas bearing at 1020 may include the controller using a pressure sensor (e.g., pressure sensor 192) to detect the pressure of the compressed gas supplied to the gas bearing. Determining the outlet pressure of the gas bearing at 1020 may include the controller using a pressure sensor (e.g., pressure sensor 194) to detect the pressure of the gas discharged from the gas bearing. For example, detecting the pressure of the gas discharged from the gas bearing may be detecting a pressure of the volume into which the gas is discharged into. For example, the gas bearings may vent to the suction inlet of the compressor such that the outlet pressure is at or about the suction pressure of the compressor. The method 1000 then proceeds from 1020 to 1030.

At 1030, the controller determines a speed setting for the compressor based on a cooling requirement. The speed setting is a speed setting for the motor of the compressor (e.g., motor 130). The cooling requirement may be received by the controller or determined by the controller. In an embodiment, the controller may be a compressor controller that receives the cooling requirement from a controller of the HVACR system. In another embodiment, the controller may be the controller of the HVACR system and may determine the cooling requirement based on a temperature set point for and a current temperature of the building/room being conditioned by the HVACR system. The method 1000 then proceeds from 1030 to 1040.

At 1040, the controller calculates a maximum speed limit for the compressor based on the inlet pressure and the outlet pressure of the gas bearing. More specifically, the maximum speed limit is a speed limit for the motor of the compressor (e.g., motor 130). For example, the maximum speed limit at 1040 is calculated based on the minimum pressure difference across the gas bearing (e.g., pressure difference=$P_1 - P_2$) for the gas bearing to provide stable support of the driveshaft 120. For example, previous testing and/or computational modeling for the compressor (e.g., testing and/or modeling of the actual compressor, its model, or a similar model)

and/or for the working fluid being used can be used to generate the relationship between the maximum speed and different operation parameters of the compressor, and said relationship can then be used by the controller to determine a maximum speed limit for the current operation parameters of the compressor.

In an embodiment, the basis for the calculation of the maximum speed limit at 1040 may also include one or more of a speed of the compressor, a speed setting for the compressor based on a cooling requirement, an evaporator pressure (e.g., $P_E$ in FIG. 1), and/or a condenser pressure (e.g., $P_E$ in FIG. 1). The controller may know the speed of the compressor based on the controller determining a speed for the compressor previously (e.g., the speed setting at 1030). Alternatively, the speed of the motor of the compressor may be detected using a voltage sensor that senses the electrical power being supplied to/used by the motor. The method 1000 then proceeds from 1050 to 1040. When evaporator pressure and/or the condenser pressure are used for calculating the maximum speed limit at 1040, the determining at 1020 may also include the controller determining a condenser pressure and/or the evaporator pressure, respectively. For example, the controller may determine the condenser pressure using a pressure sensor (e.g., pressure sensor 24) to detect the pressure of the working fluid flowing through the condenser (e.g., condenser 20). For example, the controller may determine the evaporator pressure using a pressure sensor (e.g., pressure sensor 44) to detect a pressure of the working fluid flowing through the evaporator (e.g., evaporator 40).

At 1050, the controller responds to the speed setting being greater than the maximum speed limit by adjusting the operation of the compressor so that the maximum speed of the compressor is at or below the maximum speed limit. Adjusting operation of the compressor at 1050 can include overriding the speed setting based on the cooling requirement 1052. For example, the controller overrides the speed setting and operates the compressor at the maximum speed limit. Adjusting operation of the compressor at 1050 can also additionally or alternatively include one or more of increasing the pressure of the compressed gas supplied to the gas bearing 1054 (e.g., increasing inlet pressure $P_1$) and decreasing the outlet pressure of the gas bearing 1056 (e.g., decreasing outlet pressure $P_2$). For example, increasing the pressure of the supplied compressed gas at 1054 can include the controller further opening a gas supply valve (e.g., gas supply valve 152), the external pressure source (e.g., external gas source 150) supplying the compressed gas to the gas bearings (e.g., the external pressure source supplying compressed gas at a higher pressure than the outlet pressure of the compression mechanism). For example, increasing the pressure of the supplied compressed gas at 1054 can include the controller decreasing an operating speed of the condenser fan/pump (e.g., condenser fan or pump 22) to increase the condenser pressure. For example, decreasing the outlet pressure of the gas bearing 1054 can include controller adjusting a pressure reducer (e.g., pressure reducer 118) to decrease the outlet pressure of the gas bearing. In an embodiment, adjusting the pressure reducer can include adjusting a position of inlet guide vanes or a suction inlet valve of the compressor. The inlet guide vanes or suction inlet valve can be closed (e.g., partially closed/further closed) to decrease the outlet pressure of the gas bearing.

It should be appreciated that the method 1000 in an embodiment may include features as show and/or discussed above for the heat transfer circuit 1 of FIG. 1 and/or the compressor 100 in FIG. 2.

ASPECTS

Any of Aspects 1-9 can be combined with any of Aspects 10-16.

Aspect 1. A heating, ventilation, air conditioning, and refrigeration (HVACR) system, comprising: a heat transfer circuit including a compressor, a condenser, an expander, and an evaporator fluidly connected, the compressor including a gas bearing, and one or more of the compressor and an external gas source configured to supply compressed gas to the gas bearing; and a controller electrically connected to the compressor, the controller configured to: determine an inlet pressure of the compressed gas supplied to the gas bearing and an outlet pressure of the compressed gas exiting the gas bearing, determine a maximum speed limit for the compressor based on the supply pressure of the working fluid and the outlet pressure of the gas bearing, and preventing the compressor from operating at a speed that is greater than the maximum speed limit.

Aspect 2. The HVACR system of Aspect 1, wherein the compressed gas is a portion of the gaseous working fluid that has been compressed by the compressor, the gaseous working fluid including refrigerant.

Aspect 3. The HVACR system of any one of Aspects 1-2, wherein the controller prevents the compressor from operating at the speed that is greater than the maximum speed limit includes at least one of: operating the compressor at or below the maximum speed limit, and increasing the maximum speed limit by one or more of: increasing the inlet pressure of the compressed gas supplied to the gas bearing, and decreasing the outlet pressure of compressed gas exiting the gas bearing.

Aspect 4. The HVACR system of any one of Aspects 1-3, wherein the compressor includes a pressure reducer for an outlet of the gas bearing, and the controller is configured to operate the pressure reducer to decrease the outlet pressure, such that the maximum speed limit is increased.

Aspect 5. The HVACR system of Aspect 4, wherein the pressure reducer is inlet guide vanes or a suction inlet valve for the compressor, and operating the pressure reducer is adjusting a position of the inlet guide vanes or suction inlet valve.

Aspect 6. The HVACR system of any one of Aspects 1-5, wherein the compressor is a variable speed compressor.

Aspect 7. The HVACR system of Aspect 6, wherein the controller is configured to determine a speed setting for the variable speed compressor based on a cooling requirement for the heat transfer circuit, and to override the speed setting when the speed setting is greater than the maximum speed limit.

Aspect 8. The HVACR system of any one of Aspects 1- 7, wherein the gas bearing vents the compressed gas to a suction inlet of the compressor, and the outlet pressure is at or about a suction pressure of the compressor.

Aspect 9. The HVACR system of any one of Aspects 1-8, wherein the compressed gas includes refrigerant.

Aspect 10. A method of controlling a compressor, comprising: supplying compressed gas to a gas bearing of the compressor; determining, using a controller of the compressor, an inlet pressure of the compressed gas supplied to the gas bearing and an outlet pressure of the gas bearing; calculating, using the controller, a maximum speed limit for the compressor based on the inlet pressure of the compressed gas and the outlet pressure of the gas bearing; determining a speed setting for the compressor based on a cooling requirement; and in response to determining that the speed setting is greater than the maximum speed limit as calculated, adjusting operation of the compressor such that a speed of the compressor is at or below the maximum speed limit.

Aspect 11. The method of Aspect 10, further comprising: compressing, with a compression mechanism of the compressor, a gaseous working fluid that includes refrigerant, wherein the supplying of the compressed gas to the gas bearing includes supplying a portion of the gaseous working fluid compressed by the compressor to the gas bearing.

Aspect 12. The method of any one of Aspects 10-11, wherein the adjusting of the operation of the compressor such that the speed of the compressor is at or below the maximum speed limit includes at least one of: operating the compressor at or below the maximum speed limit, and increasing the maximum speed limit by one or more of: increasing the inlet pressure of the compressed gas supplied to the gas bearing, and decreasing the outlet pressure of the gas bearing.

Aspect 13. The method of any one of Aspects 10-12, wherein the compressor includes a pressure reducer for an outlet of the gas bearing, and adjusting of the operation of the compressor such that the speed of the compressor is at or below the maximum speed limit includes operating the pressure reducer to decrease the outlet pressure of the gas bearing, the decrease in the outlet pressure of the gas bearing increasing the maximum speed limit.

Aspect 14. The method system of Aspect 13, wherein the pressure reducer is inlet guide vanes or a suction inlet valve for the compressor, and the operating of the pressure reducer is adjusting a position of the inlet guide vanes or suction inlet valve.

Aspect 15. The method of any one of Aspects 10-14, wherein the compressor is a variable speed compressor.

Aspect 16. The method of any one of Aspects 10-15, wherein the gas bearing vents the compressed gas to a suction inlet of the compressor, and the outlet pressure of the aerostatic gas bearing is at or about a suction pressure of the compressor.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A heating, ventilation, air conditioning, and refrigeration (HVACR) system, comprising:
    a heat transfer circuit including a compressor, a condenser, an expander, and an evaporator fluidly connected, the compressor including a gas bearing, and one or more of the compressor and an external gas source configured to supply compressed gas to the gas bearing; and
    a controller electrically connected to the compressor, the controller configured to:
        determine an inlet pressure of the compressed gas supplied to the gas bearing and an outlet pressure of the compressed gas exiting the gas bearing,
        determine a maximum speed limit for the compressor based on the inlet pressure and the outlet pressure, and
        preventing the compressor from operating at a speed that is greater than the maximum speed limit.

2. The HVACR system of claim 1, wherein the compressed gas is a portion of a gaseous working fluid that has been compressed by the compressor.

3. The HVACR system of claim 1, wherein the controller prevents the compressor from operating at the speed that is greater than the maximum speed limit includes at least one of:
    operating the compressor at or below the maximum speed limit, and
    increasing the maximum speed limit by one or more of:
        increasing the inlet pressure of the compressed gas supplied to the gas bearing, and
        decreasing the outlet pressure of the compressed gas exiting the gas bearing.

4. The HVACR system of claim 1, wherein
    the compressor includes a pressure reducer for an outlet of the gas bearing, and
    the controller is configured to operate the pressure reducer to decrease the outlet pressure, such that the maximum speed limit is increased.

5. The HVACR system of claim 4, wherein the pressure reducer is inlet guide vanes or a suction inlet valve for the compressor, and operating the pressure reducer is adjusting a position of the inlet guide vanes or suction inlet valve.

6. The HVACR system of claim 1, wherein the compressor is a variable speed compressor.

7. The HVACR system of claim 6, wherein the controller is configured to determine a speed setting for the variable speed compressor based on a cooling requirement for the heat transfer circuit, and to override the speed setting when the speed setting is greater than the maximum speed limit.

8. The HVACR system of claim 1, wherein the gas bearing vents the compressed gas to a suction inlet of the compressor, and the outlet pressure is at or about a suction pressure of the compressor.

9. The HVACR system of claim 1, wherein the compressed gas includes refrigerant.

10. A method of controlling a compressor, comprising:
    supplying compressed gas to a gas bearing of the compressor;
    determining, using a controller of the compressor, an inlet pressure of the compressed gas supplied to the gas bearing and an outlet pressure of the gas bearing;
    calculating, using the controller, a maximum speed limit for the compressor based on the inlet pressure of the compressed gas and the outlet pressure of the gas bearing;
    determining a speed setting for the compressor based on a cooling requirement; and
    in response to determining that the speed setting is greater than the maximum speed limit as calculated, adjusting operation of the compressor such that a speed of the compressor is at or below the maximum speed limit.

11. The method of claim 10, further comprising:

compressing, with a compression mechanism of the compressor, a gaseous working fluid that includes refrigerant, wherein the supplying of the compressed gas to the gas bearing includes supplying a portion of the gaseous working fluid compressed by the compressor to the gas bearing.

12. The method of claim 10, wherein the adjusting of the operation of the compressor such that the speed of the compressor is at or below the maximum speed limit includes at least one of:

operating the compressor at or below the maximum speed limit, and increasing the maximum speed limit by one or more of:

increasing the inlet pressure of the compressed gas supplied to the gas bearing, and decreasing the outlet pressure of the compressed gas exiting the gas bearing.

13. The method of claim 10, wherein the compressor includes a pressure reducer for an outlet of the gas bearing, and adjusting of the operation of the compressor such that the speed of the compressor is at or below the maximum speed limit includes operating the pressure reducer to decrease the outlet pressure of the gas bearing, the decrease in the outlet pressure of the gas bearing increasing the maximum speed limit.

14. The method system of claim 13, wherein the pressure reducer is inlet guide vanes or a suction inlet valve for the compressor, and the operating of the pressure reducer is adjusting a position of the inlet guide vanes or suction inlet valve.

15. The method of claim 10, wherein the compressor is a variable speed compressor.

16. The method of claim 10, wherein the gas bearing vents the compressed gas to a suction inlet of the compressor, and the outlet pressure is at or about a suction pressure of the compressor.

\* \* \* \* \*